(12) United States Patent
Sakamoto et al.

(10) Patent No.: US 8,487,209 B2
(45) Date of Patent: Jul. 16, 2013

(54) APPARATUS AND METHOD FOR LASER WELDING

(75) Inventors: Tsuyoshi Sakamoto, Zama (JP); Kazuya Okada, Yamato (JP); Yasushi Morikawa, Hiratsuka (JP); Takahisa Hasegawa, Hiratsuka (JP); Atsushi Saito, Yamato (JP); Junichi Yamashita, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1366 days.

(21) Appl. No.: 11/715,553

(22) Filed: Mar. 8, 2007

(65) Prior Publication Data

US 2007/0210040 A1 Sep. 13, 2007

(30) Foreign Application Priority Data

Mar. 9, 2006 (JP) ................................. 2006-064743
Dec. 7, 2006 (JP) ................................. 2006-331021

(51) Int. Cl.
*B23K 26/00* (2006.01)
(52) U.S. Cl.
USPC ................................. 219/121.63; 219/121.84
(58) Field of Classification Search
USPC ........................................ 219/121.63–121.86
See application file for complete search history.

(56) References Cited

U.S. PATENT DOCUMENTS

| 4,695,701 A * | 9/1987 | Monteith et al. ......... 219/121.79 |
| 4,723,063 A * | 2/1988 | Armier et al. ............ 219/121.63 |
| 4,973,247 A * | 11/1990 | Varnes et al. .................... 433/85 |
| 5,239,552 A * | 8/1993 | Okuyama et al. ................ 372/58 |
| 5,354,964 A * | 10/1994 | Kyoren et al. ............ 219/121.84 |
| 5,359,176 A * | 10/1994 | Balliet et al. ............. 219/121.84 |
| 5,607,605 A * | 3/1997 | Musasa et al. ........... 219/121.64 |
| 6,384,370 B1 | 5/2002 | Tsunemi et al. |
| 6,507,000 B2 * | 1/2003 | Otsubo et al. .............. 219/121.7 |
| 7,319,204 B2 * | 1/2008 | Schafer et al. ............ 219/121.63 |
| 7,605,345 B2 * | 10/2009 | Fukuda et al. ............ 219/121.84 |
| 2003/0132210 A1 * | 7/2003 | Fujii et al. ................ 219/121.84 |
| 2004/0140300 A1 * | 7/2004 | Yoshikawa ............... 219/121.84 |
| 2004/0226927 A1 * | 11/2004 | Morikazu et al. ........ 219/121.84 |
| 2005/0247681 A1 * | 11/2005 | Boillot et al. ............ 219/121.63 |

FOREIGN PATENT DOCUMENTS

| DE | 198 40 934 A1 | 3/2000 |
| EP | 1 440 762 A1 | 7/2004 |
| JP | 03-003895 | 1/1991 |
| JP | 05-329679 | 12/1993 |
| JP | 06-087088 | 3/1994 |
| JP | 06-182570 | 7/1994 |
| JP | 08-238587 | 9/1996 |
| JP | 09-271965 | 10/1997 |
| JP | 2001-047273 | 2/2001 |
| JP | 2002-079371 | 3/2002 |
| JP | 2004-001043 | 1/2004 |
| JP | 2004-306106 | 11/2004 |
| JP | 2007-229722 A1 | 9/2007 |
| WO | 02/072305 A1 | 9/2002 |
| WO | WO 2005118210 A1 * | 12/2005 |

* cited by examiner

*Primary Examiner* — Sang Paik
(74) *Attorney, Agent, or Firm* — Young Basile

(57) ABSTRACT

A laser welding apparatus and method reduce the effect of the fume resulting from a weld. An air injecting nozzle is installed at a laser processing head. The injecting direction of air from the air injecting nozzle is set such that the air flows across a laser beam irradiated from the laser processing head while the air flow avoids direct contact with the laser irradiating point on the work piece.

19 Claims, 17 Drawing Sheets

APPARATUS AND METHOD FOR LASER WELDING

CROSS-REFERENCE TO RELATED APPLICATION

This application claims priority from Japanese Patent Application Serial No. 2006-064743, filed Mar. 9, 2006, and No. 2006-331021, filed Dec. 7, 2006, each of which is incorporated herein in its entirety by reference.

TECHNICAL FIELD

The invention relates in general to an apparatus and method for conducting laser welding.

BACKGROUND

Laser welding is currently used to carry out robotic welding. Japanese Patent No. 3229834 discloses an example of such a welding technique, wherein a laser welding apparatus is installed at a tip of a robotic arm for irradiating a laser beam. The laser welding apparatus is configured to move away from a welding point and rotate a reflecting mirror located within the laser welding apparatus, thereby irradiating the laser beam at a predetermined welding point. Such type of welding is referred to as remote welding.

However, in laser welding, a gas with eluted metal is produced from a portion of a work piece irradiated by the laser beam. Such a gas is referred to as a fume. In particular, when irradiating the laser beam at the work piece, an anti-corrosive agent (e.g., Zn) coated over the work piece (e.g., a steel sheet) is plasmarized to produce an ion. Such an ion is then cooled so as to form a particulate after floating in air. This particulate becomes somewhat of a cloud-like matter that blocks the laser beam. Such a fume needs to be removed since it destabilizes the amount of heat that the laser beam applies to the work piece.

In conventional laser welding or processing such as that disclosed in Japanese Laid-Open Patent Publication No. 2004-1043, a device for generating airflow over the work piece is installed in order to remove the fume from around the work piece.

BRIEF SUMMARY OF THE INVENTION

Embodiments of an apparatus and method for laser welding are taught herein. One example of such an apparatus comprises a laser irradiating unit for irradiating a laser beam a laser irradiating unit for irradiating a laser beam and a first fluid injecting unit for injecting a fluid in a first fluid injecting direction to remove a fume produced by the laser beam on a work piece from a path of the laser beam to the work piece. The first fluid injecting unit can be positioned proximal to the laser irradiating unit.

Another example of an apparatus for conducting laser welding taught herein comprises means for irradiating a laser beam and means for injecting a fluid in a first fluid injecting direction to remove a fume produced by the laser beam on a work piece from a path of the laser beam to the work piece. The injecting means is positioned proximal to the irradiating means.

Methods are also taught herein. One method of conducting laser welding incorporating a laser irradiating unit and at least one fluid injecting unit comprises irradiating a laser beam on a work piece and injecting a fluid from the at least one fluid injecting unit in a direction to remove a fume produced by the laser beam on a work piece from a path of the laser beam to the workpiece. The at least one fluid injecting unit is positioned proximal to the laser irradiating unit.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

In the above-described conventional remote welding, the laser welding apparatus is moved by the robotic arm and the laser beam emitted from such an apparatus is allowed to freely move in order to irradiate the work piece. If the device for removing the fume is installed at the work piece, then it is not possible to freely move and irradiate the laser beam upon the work piece.

In contrast, embodiments of the invention provide an apparatus and method for conducting laser welding that are capable of removing a fume without obstructing laser irradiation.

For example, one laser welding apparatus taught herein can irradiate a laser beam and inject a fluid in a direction of the laser beam, where the device to inject the fluid is installed at the device for irradiating the laser. The laser welding apparatus can be installed such that an injecting direction of the fluid corresponds to a direction where a work piece irradiated by the laser beam is present. Fluid can be injected in a direction transverse to the laser beam.

By installing the fluid injecting device at the laser irradiating device, the fluid injecting device does not obstruct the laser irradiation even when the laser beam is irradiated in numerous directions. In this way, the fume is removed.

Hereinafter, embodiments of the invention are described with reference to the accompanying drawings.

Figure 1:
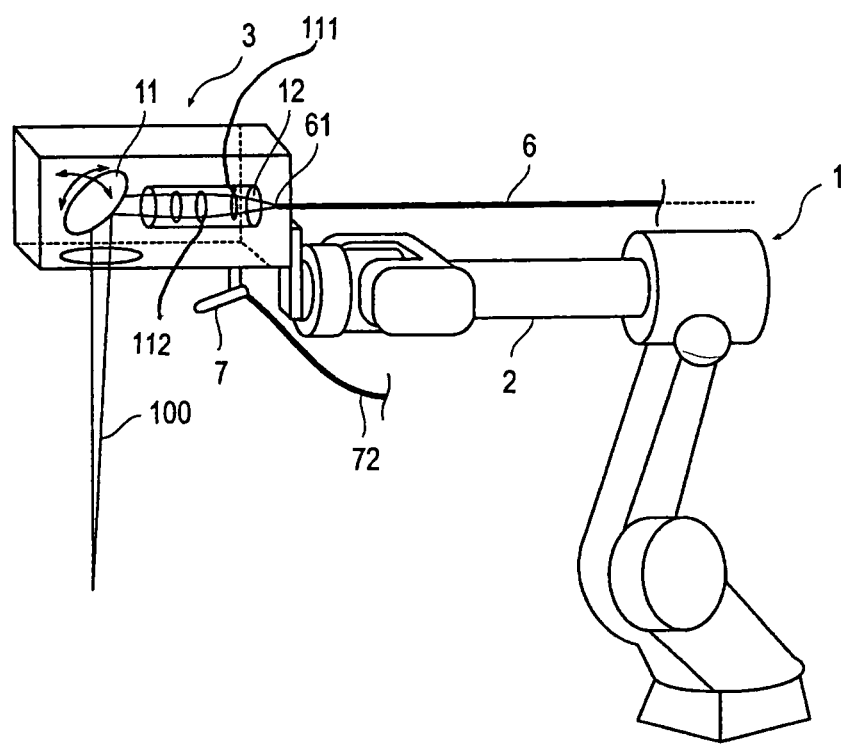
FIG. 1 is a schematic diagram illustrating a remote welding system constructed in accordance with an embodiment of the invention.

FIG. 1 is a schematic diagram illustrating a remote welding system (hereinafter, simply referred as a "system") wherein a laser welding apparatus disclosed herein is installed.

The remote welding system shown in FIG. 1 is configured to weld a work piece from a position away from the work piece using a laser. Thus, the remote welding system disclosed can weld without directly contacting a welding jig with the work piece. Such type of welding is referred to as remote welding and is different from conventional welding such as spot welding.

Disclosed in FIG. 1 is a robot 1 and a laser processing head or laser irradiating unit 3 for irradiating a laser beam 100. The laser processing head 3 is installed at a tip of an arm 2 of the robot 1. An optical fiber cable 6 guides the laser beam from a laser oscillator 5 (a laser beam source; see FIG. 2) to the laser processing head 3. An air injecting nozzle or fluid injecting unit 7 is installed at the laser processing head 3.

As for the laser oscillator 5, a YAG laser oscillator, for example, is used to guide the laser beam 100 through the optical fiber cable 6.

The robot 1 is a general multi-axis robot (also known as a multi-articulated robot, etc.). The robot 1 can change pose and allow the tip of the arm 2 with the laser processing head 3, to move in numerous directions according to the data of a motion path provided by an instructional operation.

Within the laser processing head 3 are an irradiation direction changer, for example, a reflecting mirror 11, provided to allow various irradiating directions of the laser beam 100, a collimating lens 111 for converting the laser beam 100 into a parallel light and a group of lenses 12 with a condenser 112 for changing the focus position.

The reflecting mirror 11 may be rotated in a two-axis direction as shown in FIG. 1. Further, the reflecting mirror 11 is capable of changing the irradiation direction of the laser beam 100 from the group of lenses 12. Thus, a drive mechanism (not shown) for rotating the reflecting mirror 11 is provided inside the laser processing head 3. Such a drive mechanism is known to those skilled in the art so is not further described herein.

By using such a laser processing head 3, the laser beam 100 emitted from an emitting end 61 of the optical fiber cable 6 can be reflected by the reflecting mirror 11 from the group of lenses 12 and is irradiated in the direction of a welding position. Consequently, the laser processing head 3 can change the irradiating direction of the laser beam without moving the laser processing head 3 itself.

The air injecting nozzle 7 injects air that is guided through an air hose 72 from an air pump 75 (shown in FIG. 2), which is separately installed. Further, although the fluid being injected is described as dry air, the invention is certainly not limited thereto. That is, it is also possible that the fluid being injected is an inert gas such as nitrogen gas, helium gas, etc.

The air injecting nozzle 7 is installed such that an air flow produced by the injected air is in a direction toward the work piece 200 irradiated by the laser beam 100 from the laser processing head 3 side. As shown, the direction is also transverse to the laser beam 100. Further, the air injecting nozzle 7 is configured such that the injection range of air can be defined. By using a nozzle in which the injecting range is defined, the air injecting nozzle 7 can be installed such that the injected air does not directly contact a laser irradiating point P (i.e., welding point) on the work piece 200 (not shown in FIG. 1). This is explained in additional detail hereinafter.

Figure 2:
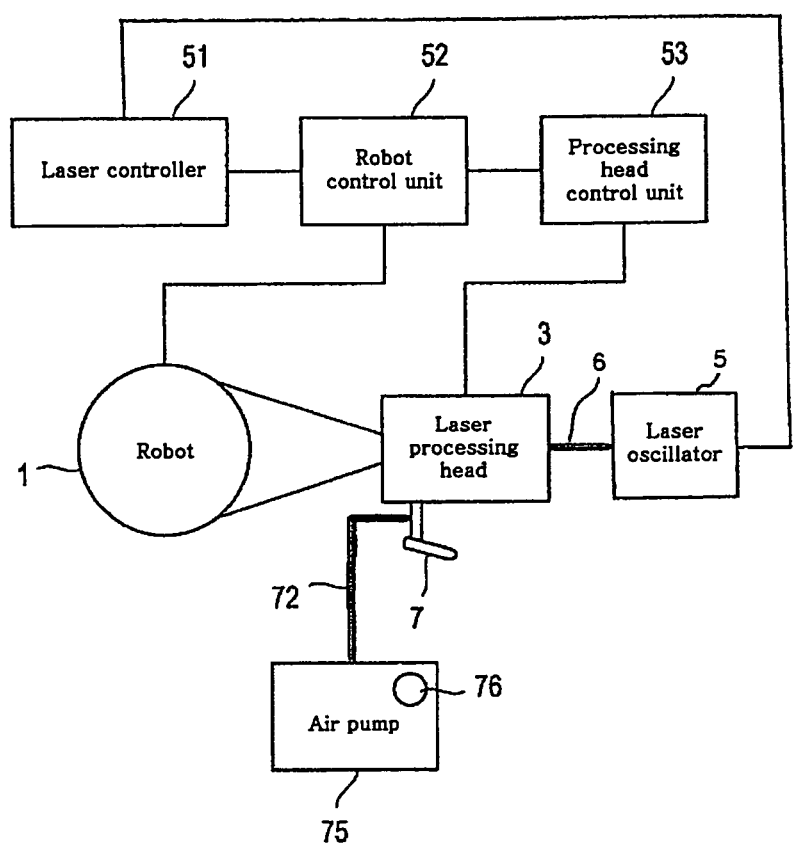
FIG. 2 is a block diagram illustrating a control system of the remote welding system constructed in accordance with an embodiment of the invention.

FIG. 2 is a block diagram illustrating system control. The control system comprises a laser controller 51 for controlling a laser power-on/off, etc., in the laser oscillator 5, a robot control unit 52 for controlling a motion of the robot 1 and a processing head control unit 53 for controlling the reflecting mirror 11 and the group of lenses 12 in the laser processing head 3.

The laser controller 51 performs a laser power-on/off and an adjustment of the laser power strength, etc. The laser controller 51 performs the laser power-on/off according to a control signal from the robot control unit 52.

In one embodiment of the invention, in addition to operating the robot 1, the robot control unit 52 also operates the reflecting mirror 11 and the group of lenses 12 and outputs a control signal of the laser power-on/off, etc. Further, both the operations of the robot 1 and the reflecting mirror 11 are performed when instructions for operating the robot 1 are provided. Thus, the robot control unit 52 outputs various control signals to perform the operations of the robot and the reflecting mirror based on the instructed data, referred to as a teaching program.

The processing head control unit 53 controls the operations of the reflecting mirror 11 and the group of lenses 12 inside the laser processing head 3 based on the control signal from the robot control unit 52.

A switch 76 is installed at the air pump 75 for turning the operation of the air pump 75 on and off. In one embodiment of the invention, since the air pump 75 only functions to pump air out, if the switch is turned on manually to pump the air to the air injecting nozzle 7 when starting the laser welding operation, then it needs to only keep the air pump 75 in operation until all the operations are finished, regardless of the emission of the laser beam. However, it should be noted that the invention is certainly not limited thereto. For example, it is also possible that the turning on/off of the air pump 75 is performed automatically according to the control signal from the robot control unit 52. In such a case, an instruction for determining the timing for turning the air pump 75 on/off is previously recorded in the teaching program of the robot. Also, the inclusion of an opening time is also possible.

Figure 3A:
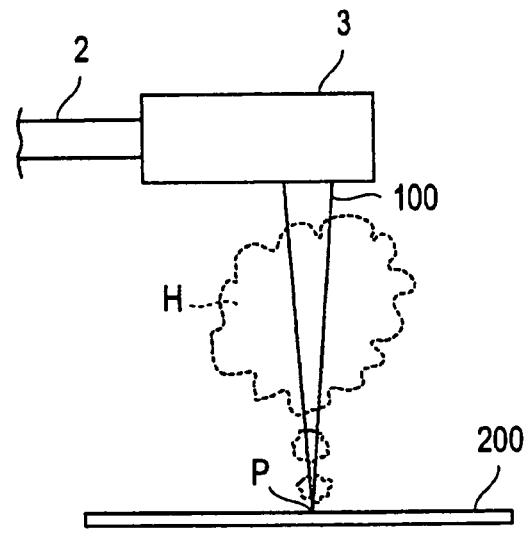
FIGS. 3a and 3b are side views illustrating the operations of a fume and air injection according to an embodiment of the invention.
Figure 3B:
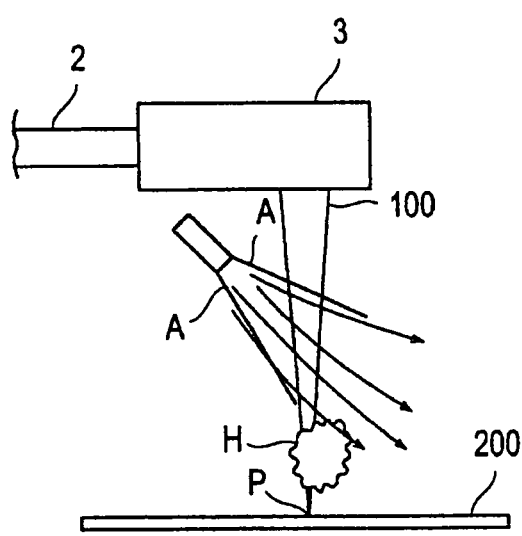

FIGS. 3a and 3b are diagrams illustrating the operations of the fume and air injection in remote welding. FIG. 3a shows a case in which air is not injected, whereas FIG. 3b shows a case in which air is injected. Further, since FIGS. 3a and 3b are provided to illustrate the operation of air injection, the expression of each component is simplified.

First, as shown in FIG. 3a, when the air is not injected, the work piece 200 is heated by the laser beam at the laser irradiating point P (welding point) of the work piece 200. The material of the work piece 200 is vaporized to produce a fume H in remote welding. The fume H rises up vertically between the work piece 200 and the laser processing head 3 and blocks the laser beam 100.

However, as shown in FIG. 3b, when the air A is injected according to one embodiment, the air flow injected from the air injecting nozzle 7 is transverse to the irradiated laser beam 100. Thus, the fume H produced from the work piece 200 can be removed or blown out without rising up vertically, and the laser beam is not blocked by the fume H. As shown in FIG. 3b, although the irradiating direction of a laser beam generally corresponds to a direction in which the work piece is present, the irradiating direction of the laser beam slightly deviates from the latter direction when the work piece is small.

The injection range of the injected air is explained next.

Figure 4:
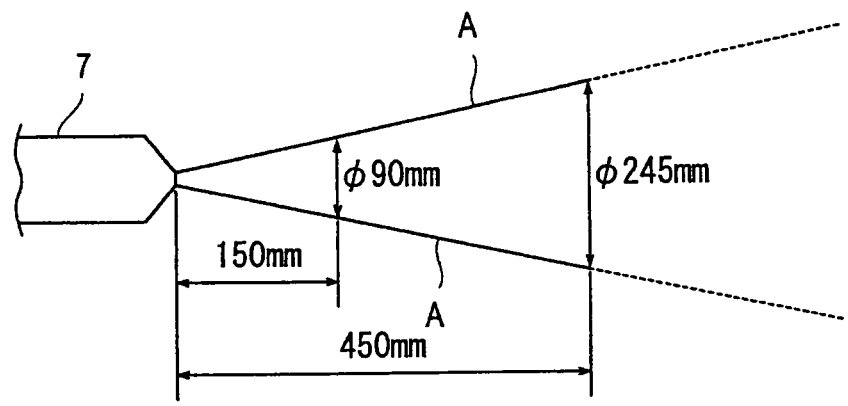
FIG. 4 is a diagram illustrating an air injecting nozzle (injecting port) and an injection range of an air injected from the nozzle.

FIG. 4 is a diagram illustrating an air injecting nozzle 7 and the injection range of air A from the air injecting nozzle 7. The injection range of air A injected from the air injecting nozzle 7 depends on the shape of an injecting port at the tip of the air injecting nozzle 7. The injection range is a diffusive flow such that it has, for example, a diameter of 90 mm at a point 150 mm forward from the tip of the nozzle, a diameter of 245 mm at a point 450 mm forward from the tip of the nozzle, etc., and can be proportionally expanded further forward therefrom to form a cone shape as shown in FIG. 4. Further, it is possible to remove the fume H over a wide range. Such an injection range of the air A is referred to as an air-cone pattern, an air-flow pattern, etc.

The air injecting nozzle 7 is installed at the processing head 3 and is operated together with the processing head 3. As mentioned above, the air injecting nozzle 7 has a wide injection range of air A. In this way, the air injecting nozzle 7 can be configured such that the injected air is oblique to the laser during any operation of the robot 1 or reflecting mirror 11. In one embodiment of the invention, the air injecting nozzle 7 is installed at the processing head 3 such that the laser irradiating point P is not included within the injection range of air (within a range indicated by line A in FIGS. 3b and 4) defined by the injecting port at the tip of the air injecting nozzle 7. As such, not including the laser irradiating point P within the injection range of air plays a role in the in-line test, which is often conducted and currently practiced in the relevant art.

The in-line test determines whether the welding has been well performed by imaging an area including the laser irradiating point P of the work piece 200 using a video camera to capture a change in the strength of the plasma. If the produced plasma is blown out or removed by the air injected from the air injecting nozzle 7, it is likely to obstruct the in-line test. Since the injection range of air is somewhat limited as mentioned above, the air flow does not directly contact the laser irradiating point P. Thus, the produced plasma is not blown out or removed.

Further, although ambient air is involved in the air flow of the injected air so as to be indirectly blown out or removed to the laser irradiating point P, it does not blow out or remove the plasma since the ambient air flow is weaker than the direct air flow. Therefore, it has less of an effect upon the invention. Thus, even when the in-line test is performed by monitoring the plasma produced during laser welding, the fume H is blown out or removed without obstructing the in-line test, thereby removing it from the irradiation path of the laser beam.

In one embodiment of the invention, the air injecting nozzle 7 is installed at the laser processing head 3. Thus, even when irradiating the laser beam in several directions, the air injecting nozzle 7 does not obstruct the laser irradiation but does effectively remove the fume H. Because the injection range of air is set such that the air injected to the laser irradiation point P is not in direct contact therewith, it is possible to remove the fume H without obstructing the in-line test, etc.

Figure 5:
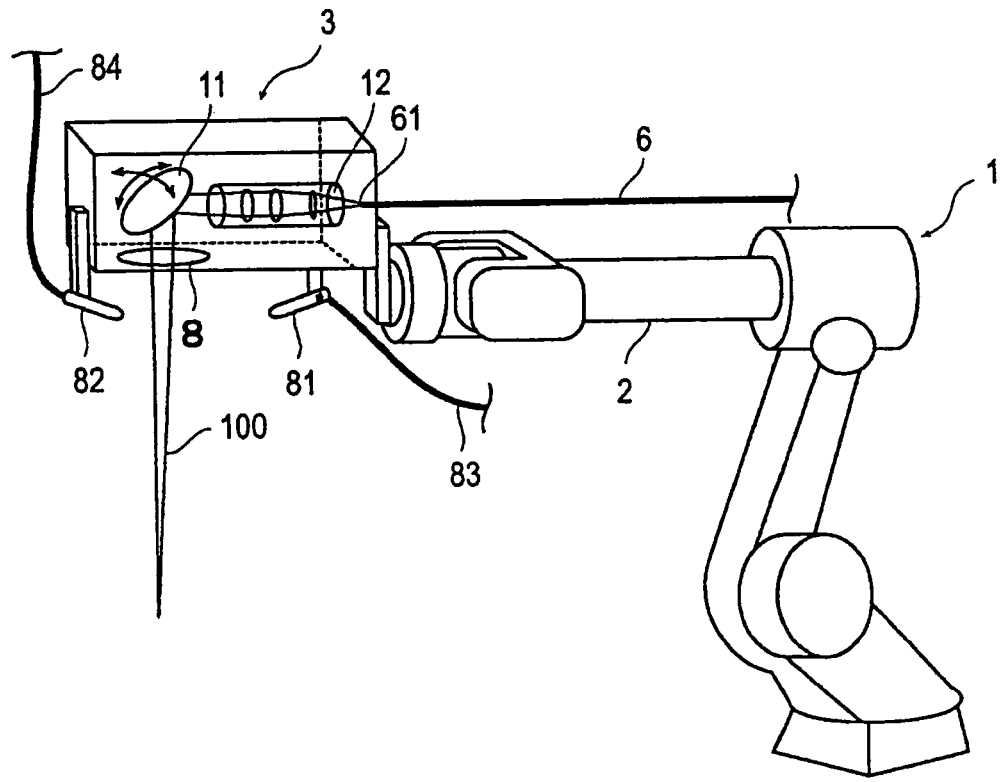
FIG. 5 is a schematic diagram illustrating a remote welding system constructed in accordance with a second embodiment of the invention.
Figure 6:
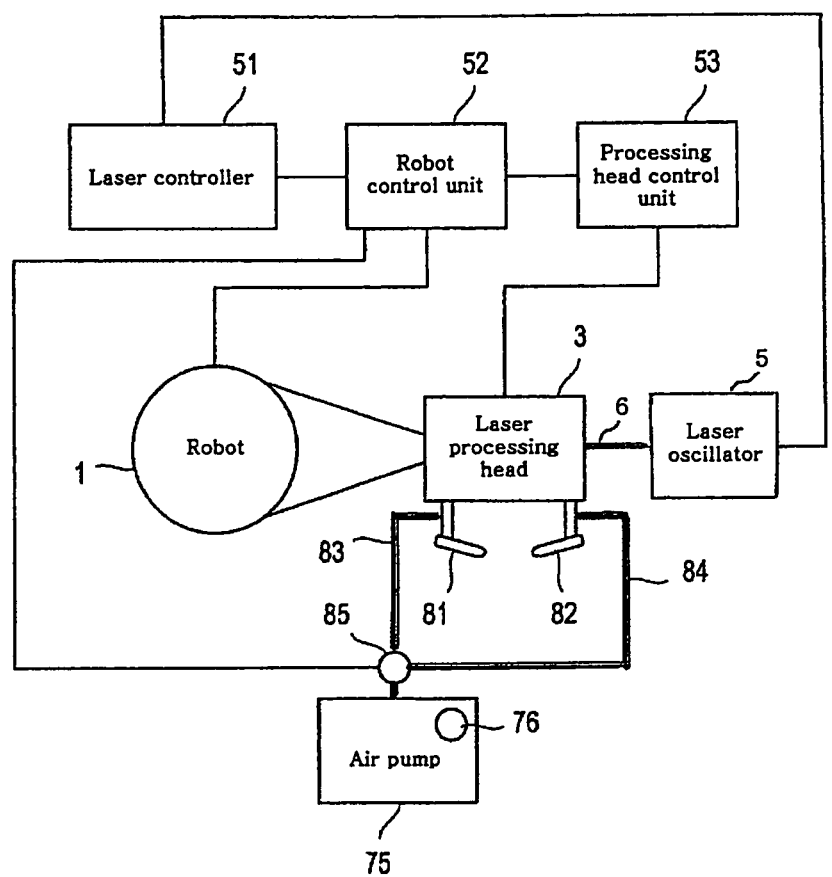
FIG. 6 is a block diagram showing a control system of the remote welding system constructed in accordance with the second embodiment.

FIG. 5 is a schematic diagram illustrating a system constructed in accordance with a second embodiment of the invention. FIG. 6 is a block diagram illustrating a control process of the system, which is constructed in accordance with the second embodiment.

In the system, two air injecting nozzles 81 and 82 are installed under the laser processing head 3. One of the installation positions of the two air injecting nozzles 81 and 82 is in a first position, which is at the side where a robotic arm 2 connects to the laser processing head 3. The other installation position is at a second position; which is the tip side of the laser processing head 3 opposite to the first position. In other words, the two air injecting nozzles 81 and 82 are installed such that their injecting directions of air are diametrically opposed to each other. In this arrangement the positions are located on the underside of the laser processing head 3. Also, the installation positions do not interfere with the laser emitting port 8, which discharges the laser beam, so as not to obstruct the laser beam 100. As shown, the two air injecting nozzles 81 and 82 are identical to the air injecting nozzle 7 as described above although this is not necessary.

Referring also to FIG. 6, using a switching valve 85, the air is guided from the air pump 75 to the two air injecting nozzles 81 and 82 through the use of air hoses 83 and 84, respectively. The switching valve 85 switches the air path to transfer the air to either one of the air injecting nozzles 81 and 82. The switching operation of the switching valve 85 is performed using a signal from the robot control unit 52. Thus, the instruction for the switching operation of the switching valve 85 is also recorded in the teaching program of the robot control unit 52.

The jetting directions of air of the air injecting nozzles 81 and 82 can correspond to directions transverse to the laser beam, as described above in relation to the first described embodiment. As shown, it is configured that the laser irradiating point P is not included within the injection range of air. The other features are similar to those of the first embodiment. Thus, their explanations are omitted.

Figure 7:
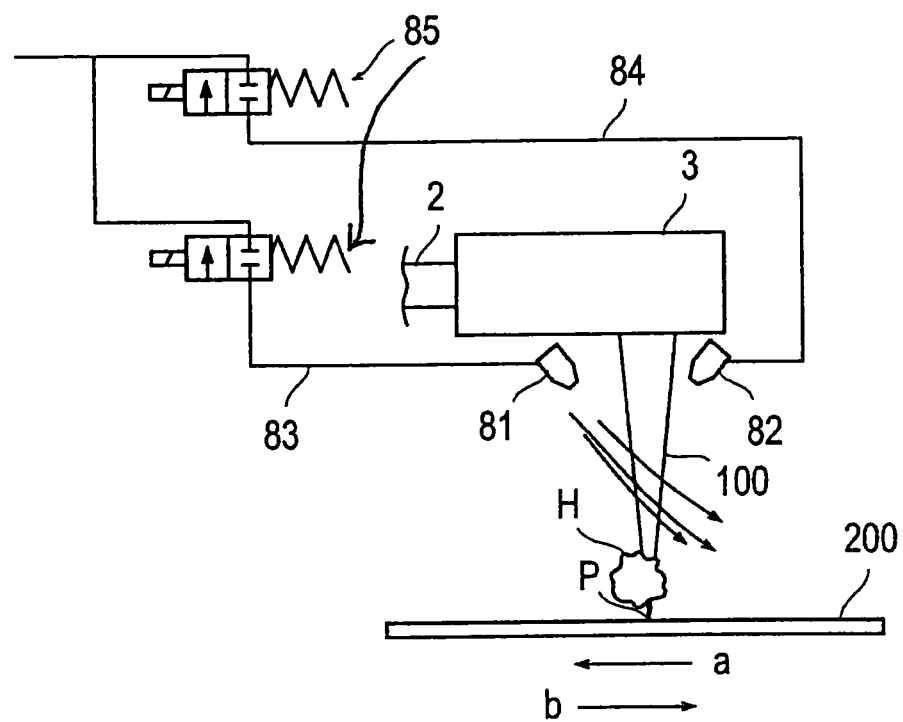
FIG. 7 is a diagram illustrating the operation of an air injection according to the second embodiment.

FIG. 7 is a diagram illustrating the operation of air injection according to the second embodiment. Because FIG. 7 is provided to illustrate the operation of air injection, each component is expressed in a simplified manner.

The disclosed system is configured such that it can move the laser irradiating point P by moving the laser processing head 3 using the robot 1 or by moving the reflecting mirror 11. Therefore, in the second embodiment, the switching valve 85 is switched in order to inject the air opposite to the direction of moving the laser irradiating point P. In other words, when moving the laser irradiating point P in the direction indicated by the arrow "a", the switching valve 85 is switched in order to inject the air from the air injecting nozzle 81. When moving the laser irradiating point P in the direction indicated by the arrow "b", the switching valve 85 is switched in order to inject the air from the air injecting nozzle 82.

By doing so, the fume H produced from the work piece 200 is blown out or removed backwards with respect to the direction that the laser irradiating point P is moving. Thus, when moving the laser irradiating point P the fume H does not diffuse in the direction of the laser beam so that the laser beam is not affected by the fume H.

Although the laser irradiating point P may move in two directions (a-direction and b-direction), it is possible to freely move the laser irradiating point P in a direction other than these two directions. Therefore, in practice, injecting the air from the air injecting nozzle positioned at a side so as to blow out or remove the fume H slightly backwards with respect to the direction of motion of the laser irradiating point P can be done. In addition, in the second embodiment, although the two air injecting nozzles 81 and 82 are installed, the disclosed invention is not limited to such a feature. It is possible to install more than two air injecting nozzles, for example, three or four air injecting nozzles. By doing so, the fume H can be more effectively blown out or removed backwards with respect to the direction of motion of the laser irradiating point P.

Moreover, although the laser irradiating point may be moved by moving the irradiating position of the laser beam with the reflecting mirror and/or the laser processing head 3 using the robotic arm 2, the invention is not limited to such a feature. That is, embodiments such as the second embodiment are also adapted such that the laser irradiating point P may be moved by moving the work piece 200 while irradiating the laser beam 100 at a constant position.

The system in accordance with a third embodiment of the invention are similar to those shown in FIG. 5 since two air injecting nozzles 81 and 82 are installed to the laser processing head 3. However, the third embodiment is different from the second embodiment in that the third embodiment is not provided with the switching valve 85. Because the third embodiment is otherwise similar to FIG. 5, a drawing has not been separately provided.

Figure 8A:
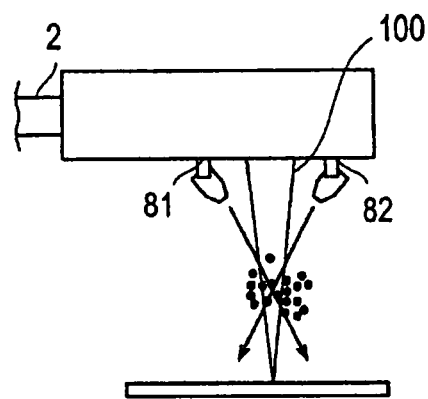
FIGS. 8a and 8b are diagrams illustrating the operation of a remote welding system constructed in accordance with a third embodiment of the invention.
Figure 8B:
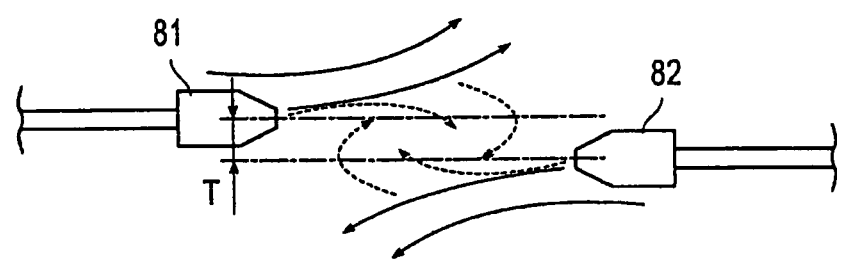

FIGS. 8a and 8b are diagrams illustrating the operation of the system constructed in accordance with the third embodiment. FIG. 8a is a side view, and FIG. 8b is a diagram of a laser outlet. Each component in FIGS. 8a and 8b is expressed in a simplified manner.

In this third embodiment, the installation positions of the air injecting nozzles 81 and 82 are set such that the air injecting positions are spaced away from each other by an offset width T, and the air is injected from both the air injecting positions during welding as shown in FIG. 8b. For this reason, the switching valve 85 is not required. The air injected from the air injecting nozzles 81 and 82 produce a vortex as shown in FIG. 8b. Such a vortex serves to blow out the air by centrifugal force. Therefore, it is possible to blow out the created fume by using the vortex.

Figure 9:
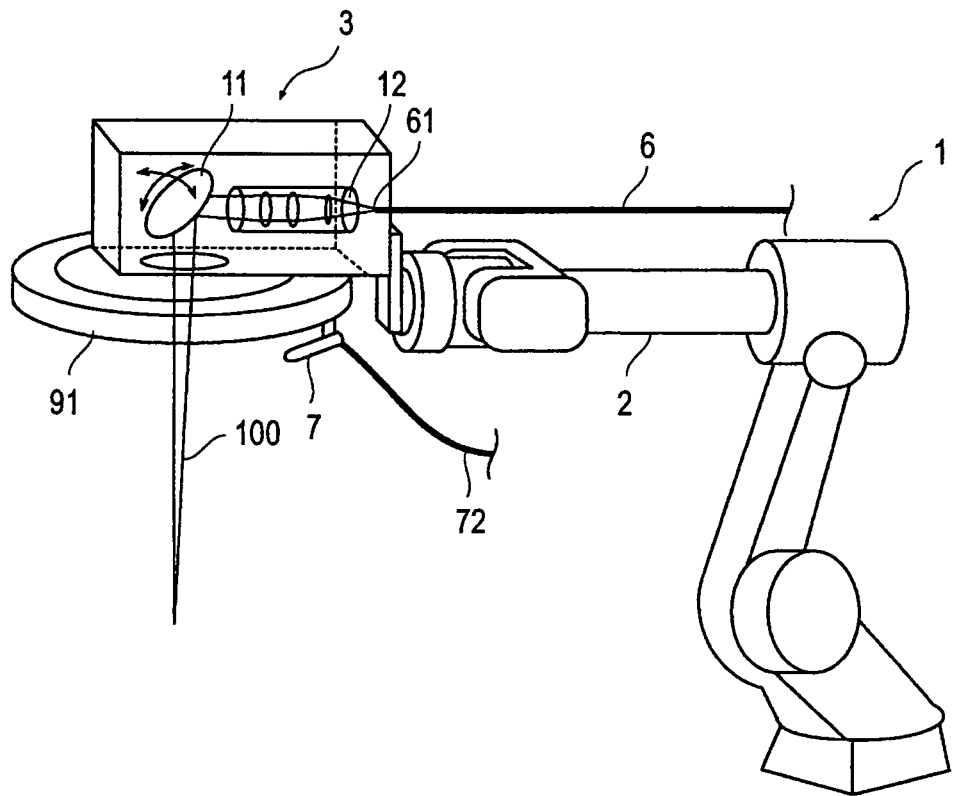
FIG. 9 is a schematic diagram illustrating a remote welding system constructed in accordance with a fourth embodiment of the invention.
Figure 10:
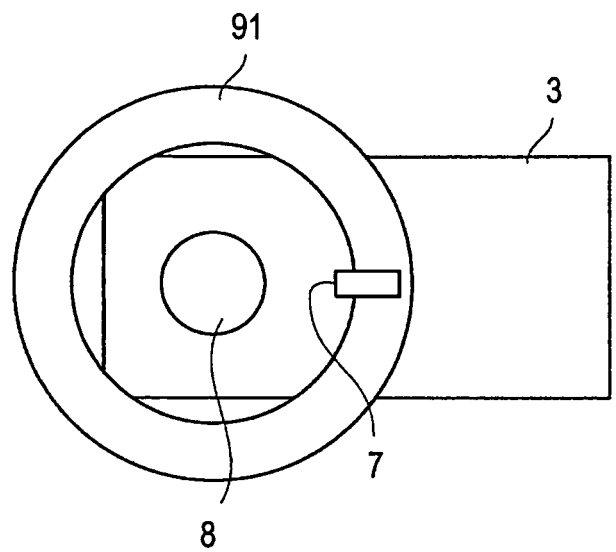
FIG. 10 is a schematic diagram illustrating a laser processing head when viewed from a laser outlet side.
Figure 11:
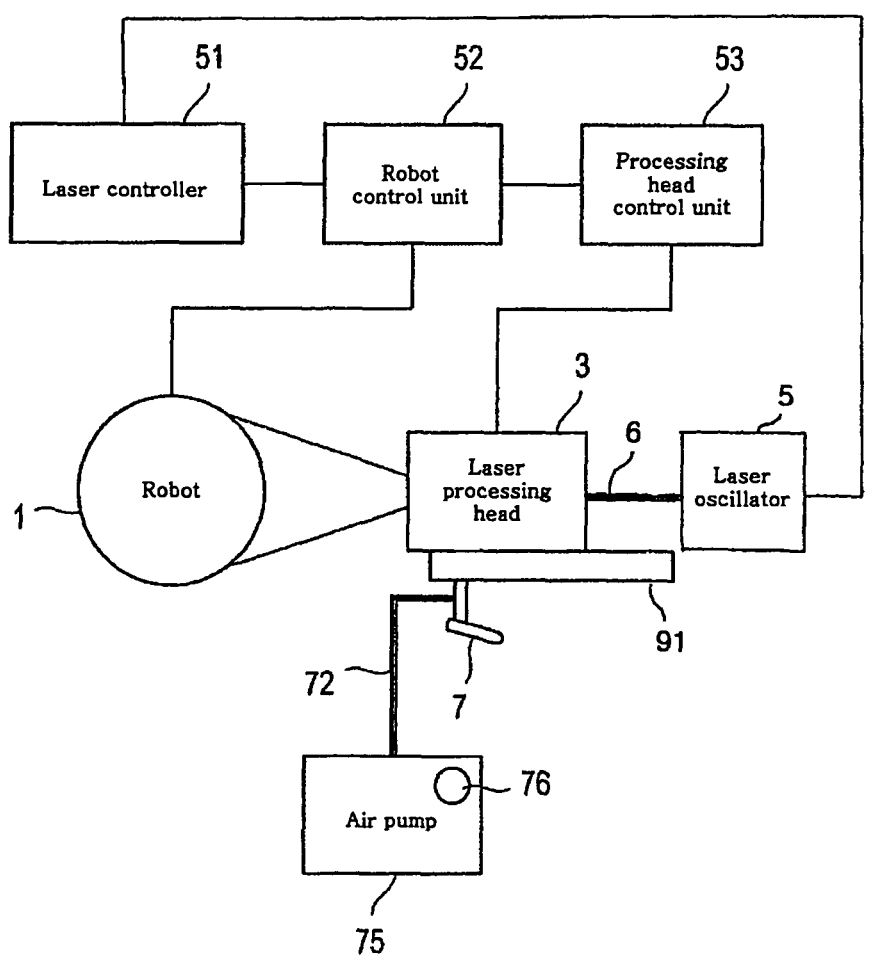
FIG. 11 is a block diagram illustrating a control system of the remote welding system constructed in accordance with the fourth embodiment.

FIG. 9 is a schematic diagram illustrating a system constructed in accordance with a fourth embodiment of the invention. FIG. 10 is a schematic diagram of a laser processing head 3 when viewed from a laser emitting port side. FIG. 11 is a block diagram illustrating a control process of the system constructed in accordance with the fourth embodiment.

The system of the fourth embodiment is configured such that a movable ring 91 for moving the fluid injecting position is installed under the laser processing head 3, and the air injecting nozzle 7 is installed at the movable ring 91. The other features are similar to those of the first described embodiment, thus, their explanations are omitted herein.

The movable ring 91 may be a ring-shaped linear motor, an ultrasonic motor, etc. By using the movable ring 91, the air injecting nozzle 7 is moved about the laser injecting port 8. Consequently, the air injected from the air injecting nozzle 7 is always directed toward the laser beam side. Further, the movable ring 91 is not limited to the linear motor or the ultrasonic motor since it is also possible to use a conventional motor and gear mechanism. The movable ring 91 can be operated using an instruction from the robot control unit 52 to change the position of the air injecting nozzle 7. Thus, the control system according to the fourth embodiment is configured to send a control signal from the robot control unit 52 to the processing head control unit 53 for moving the movable ring 91 and for operating the movable ring 91 via the laser processing head 3.

Figure 12A:
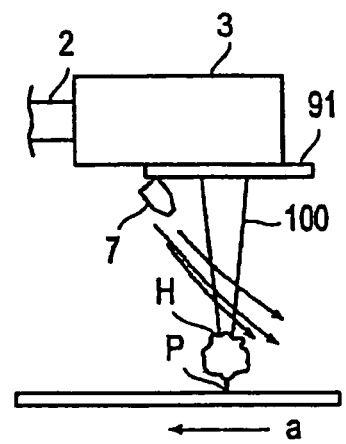
FIGS. 12a to 12c are diagrams illustrating the first operation of an air injection according to the fourth embodiment.
Figure 12B:
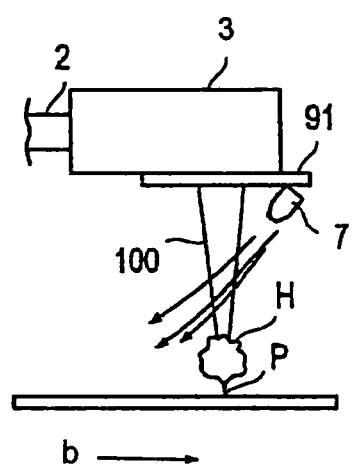
Figure 12C:
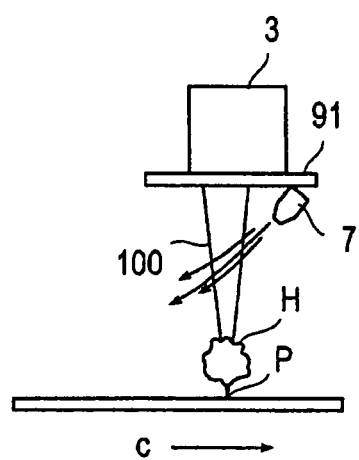

FIGS. 12a and 12b are side views illustrating the first operation of air injection according to the fourth embodiment. FIG. 12c is a front view when viewed from a tip of the laser processing head 3. In these figures, each component is expressed in a simplified manner.

As shown in FIG. 12a, when the air injecting nozzle 7 is provided at the robotic arm side (a first position), it is possible to inject the air from a direction opposite to that of the laser emitting point P when moving the laser emitting point P in the direction indicated by the arrow "a". On the other hand, as shown in FIG. 12b, in case the air injecting nozzle 7 is provided at a tip side (a second position) when viewed from the robotic arm side, it is possible to inject the air from a direction opposite to that of the laser emitting point P when moving the laser emitting point P in the direction indicated by the arrow "b". In addition, as shown in FIG. 12c, the air injecting nozzle 7 could be provided in any position between the first and second positions. Thus, even when moving the laser emitting point P in a lateral direction indicated by the arrow "c", it is possible to inject the air from a direction opposite to that of the laser emitting point P.

According to the first operation of the fourth embodiment, since the air injecting nozzle 7 can be moved to any position between the first and second positions with the laser emitting port 8 being an objective point, the air can be more effectively injected from a direction opposite to that of the laser emitting point P even when moving the laser emitting point P in any direction. In such a case, the teaching program of the robot control unit 52 needs to record the instruction for moving the movable ring 91 according to a predetermined direction of the laser emitting point P. The first operation according to the fourth embodiment is similarly adapted even when the work piece 200 is moved so as to move the laser emitting point P while irradiating the laser beam 100 at a constant position.

Figure 13A:
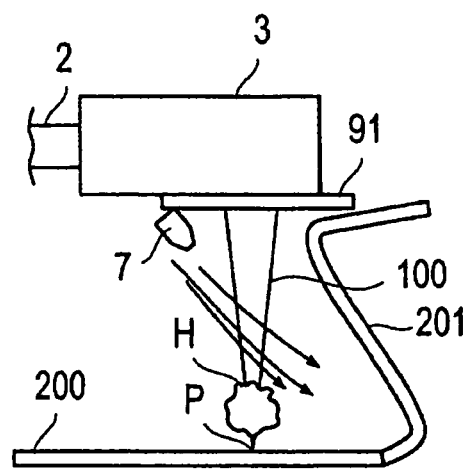
FIGS. 13a and 13b are diagrams illustrating the second operation of an air injection according to the fourth embodiment.
Figure 13B:
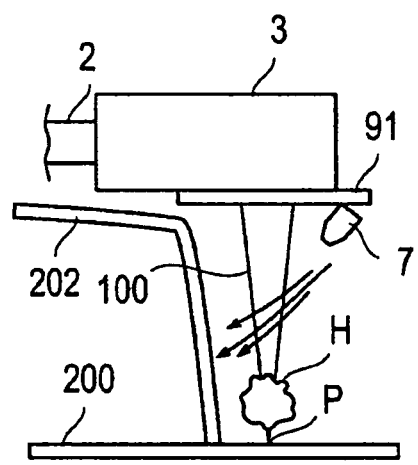

FIGS. 13a and 13b are diagrams illustrating the second operation of air injection according to the fourth embodiment. In these figures, each component is expressed in a simplified manner.

The shape of the work piece 200 that is subject to welding may vary. For example, an extension 201 or 202 may be provided at the work piece 200. When the extension 201 or 202 is provided at the work piece 200, the movable ring 91 can rotate so as to move the air injecting nozzle 7 at a position without interfering with the extension 201 or 202. Thus, according to the second operation of the fourth embodiment, it is possible to move the air injecting nozzle 7 installed at the laser processing head 3 without interfering with the extensions 201, 202 when the extensions 201, 202 are provided at the work piece 200 or even when a peripheral structure other than the work piece 200 is provided. This allows the laser processing head 3 to be freely moved to a desirable position.

Figure 14:
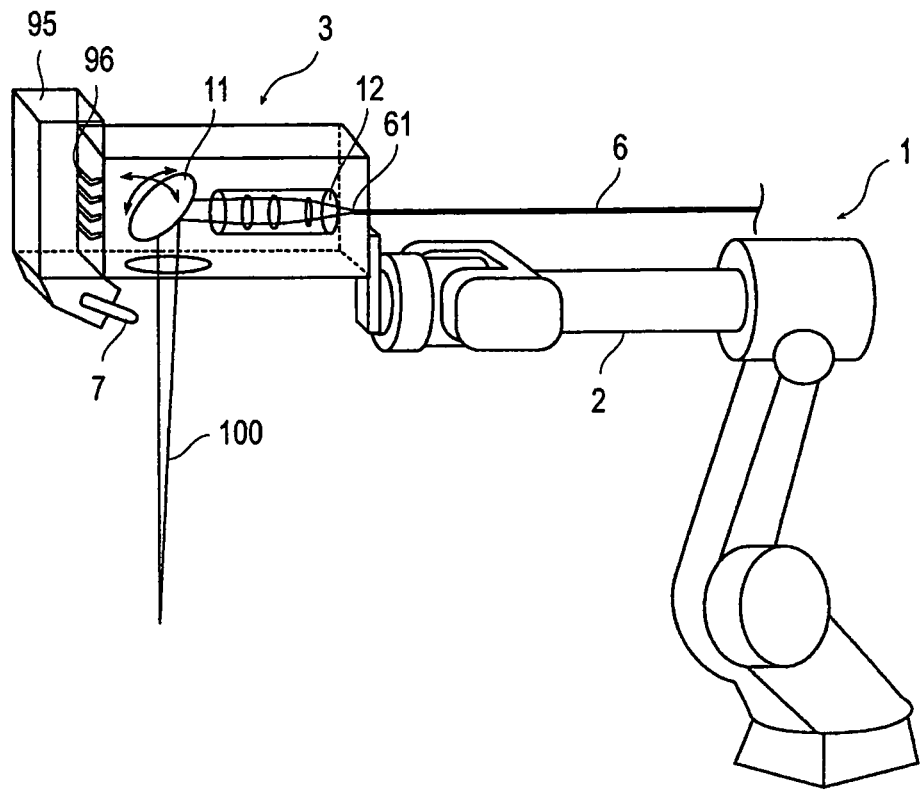
FIG. 14 is a schematic diagram illustrating a system constructed in accordance with a fifth embodiment of the invention.

FIG. 14 is a schematic diagram illustrating a system constructed in accordance with a fifth embodiment of the invention. As shown in FIG. 14, an air flow path 95 is formed at a tip of the laser processing head 3. The air injecting nozzle 7 is installed within the air flow path 95. A gap is formed between an inner wall of the air flow path 95 and the air injecting nozzle 7. Further, a heat radiating fin 96 is installed at a housing of the laser processing head 3 within the air flow path 95.

Figure 15:
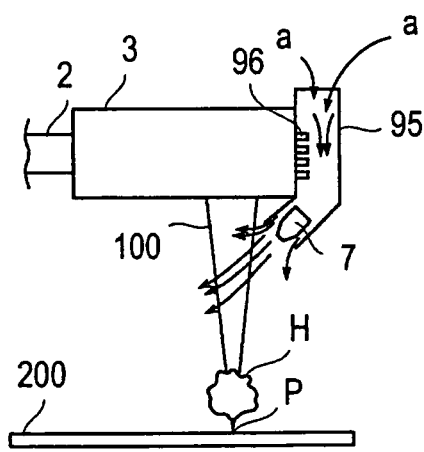
FIG. 15 is a side view illustrating an operation according to the fifth embodiment.

FIG. 15 is a diagram illustrating the operation according to the fifth embodiment. If air is injected from the air injecting nozzle 7 installed within the air flow path 95, then ambient air "a" is drawn by the air flow. Consequently, the air flow is also created within the air flow path 95 to contact the heat radiating fin 96, thereby effectively cooling the housing of the laser processing head 3. An optical system is present inside the laser processing head 3. The inside of the laser processing head 3 is sealed to prevent dust from entering. Subsequently, heating inevitably occurs when the laser beam 100 passes through the inside of the laser processing head 3. Such heating can be effectively eliminated by cooling the housing of the laser processing head 3.

In addition, the system according to the fifth embodiment has a simple structure in that the air injecting nozzle 7 is installed within the air flow path 95. It is possible to blow out or remove the fume H while cooling the laser processing head 3. Further, the control of the air injection is configured such that it can operate the air pump 75 in a simple manner similar to the first embodiment. Thus, no specific control is required.

Figure 16:
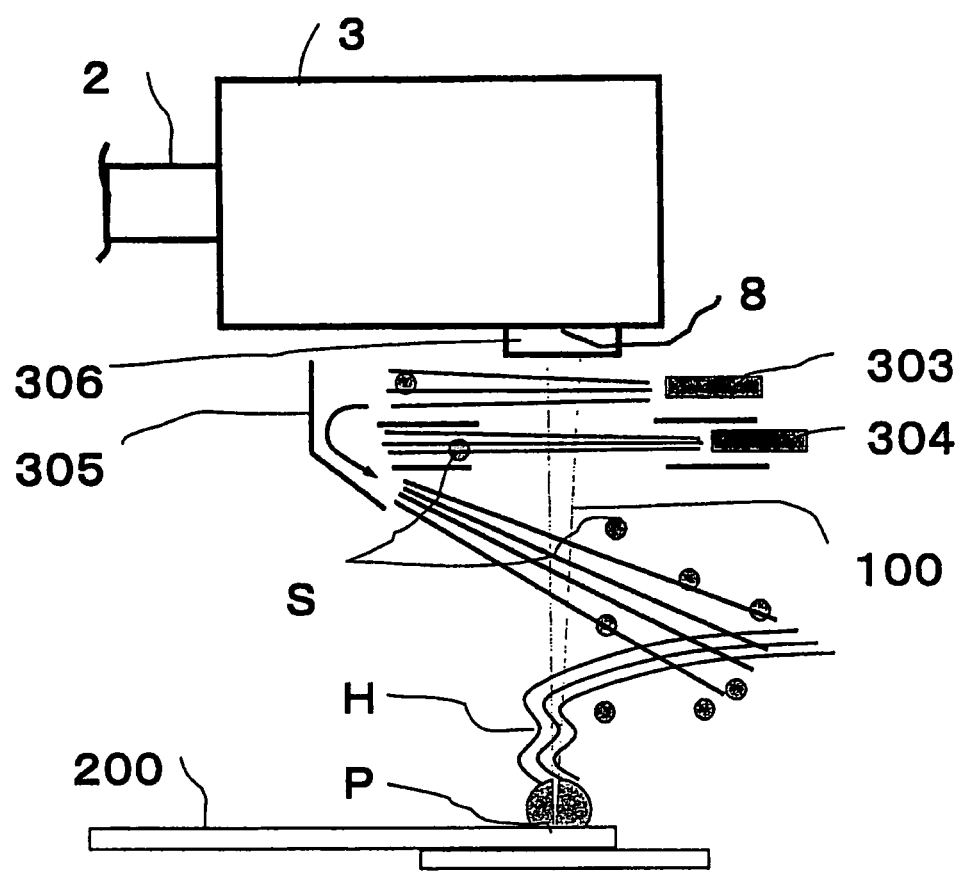
FIG. 16 is a schematic diagram illustrating a system constructed in accordance with a sixth embodiment of the invention.

FIG. 16 is a schematic diagram illustrating a system constructed in accordance with a sixth embodiment of the invention. As shown in FIG. 16, air injecting nozzles 303 and 304 form a fluid injecting unit and are installed to inject the air along a lens protecting glass 306 installed at a laser emitting port 8 of the laser processing head 3 forming a laser irradiating unit. A deflection plate 305 is also installed for deflecting the injected air from the air injecting nozzles 303 and 304 in a direction transverse to the laser beam 100. In such a matter, it is possible to prevent a spatter S produced during laser processing from adhering to the lens protecting glass 306 of the laser processing head 3. At the same time, it is also possible to allow the injected air to be deflected to thereby remove the fume H. Accordingly, it is possible to reduce the contamination of the lens protecting glass 306 in order to reduce the frequency of cleaning and to improve the service life of the lens protecting glass 36. Further, it is possible to use the injected air to remove the fume H, thereby reducing the energy cost.

If the pressure of the upper air injecting nozzle 303 closer to the lens protecting glass 306 is established higher than the pressure of the lower air injecting nozzle 304 spaced away from the lens protecting glass 306, then it is possible to control the direction of the air flow so as to direct the pressured air downwards. Thus, the spatter S can be allowed to be pushed back and downwards away from the lens protecting glass 306, thereby effectively preventing the spatter from adhering to the lens protecting glass 306.

Figure 17A:
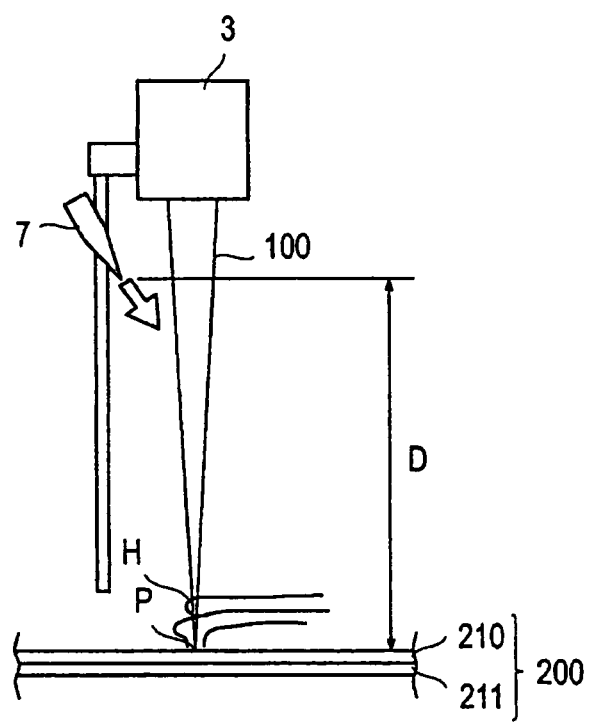
FIGS. 17a and 17b are schematic diagrams illustrating an experimental device.
Figure 17B:
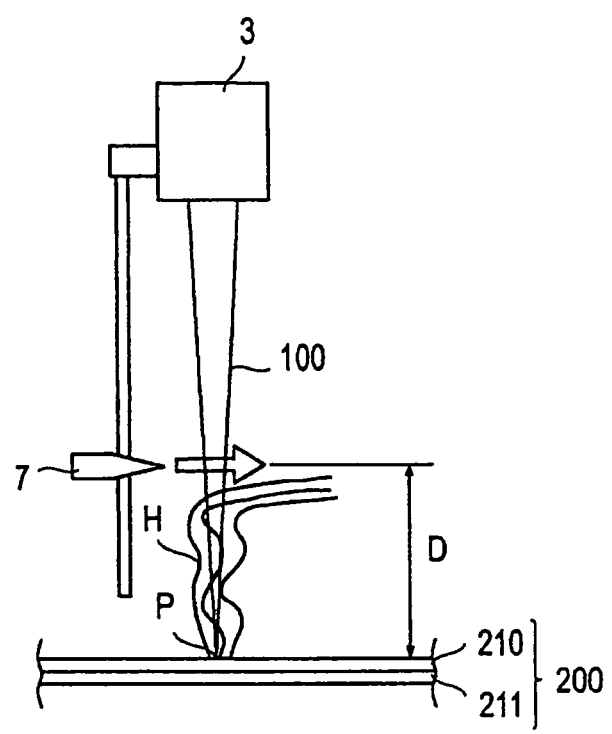

An embodiment that performs laser welding while blowing the fume H is explained in FIGS. 17a and 17b. FIGS. 17a and 17b are schematic diagrams showing an experimental device. To perform an experiment of an embodiment of the invention, an experimental device is prepared wherein the air injecting nozzle 7, which is capable of changing its height and direction, is installed at the laser processing head 3. This experimental device can change the height D from the work piece 200 to the air injecting nozzle 7 while maintaining the height from the work piece 200 to the laser processing head 3.

Using this experimental device in the first embodiment shown in FIG. 17a, the air injected from the air injecting nozzle 7 is set to a direction transverse to the laser beam 100, while the laser irradiating point P is set so as not to be included within the injection range of injected air. Then, laser welding is performed while changing the height D.

In the second embodiment as shown in FIG. 17b, the air injected from the air injecting nozzle 7 is set to be in a direction transverse to the laser beam 100. Then, laser welding is performed while changing the height D.

The laser welding conditions are the same in the first and second embodiments. The distance from the laser emitting port 8 of the laser processing head 3 to the laser irradiating point P of the work piece 200 is 560 mm and a laser power is 4 kW. Further, the diameter of the condenser (a laser irradiating point P) is 0.7 mm and the injected air pressure is 0.5 Pa. In addition, the flow rate of air is 180 liter/min, and an upper plate 210 of the work piece 200 is a steel plate without any plating, which has a width of 1.4 mm. A lower plate 211 of the work piece 200 is a zinc-plated steel plate having a width of 0.65 mm.

Figure 18:
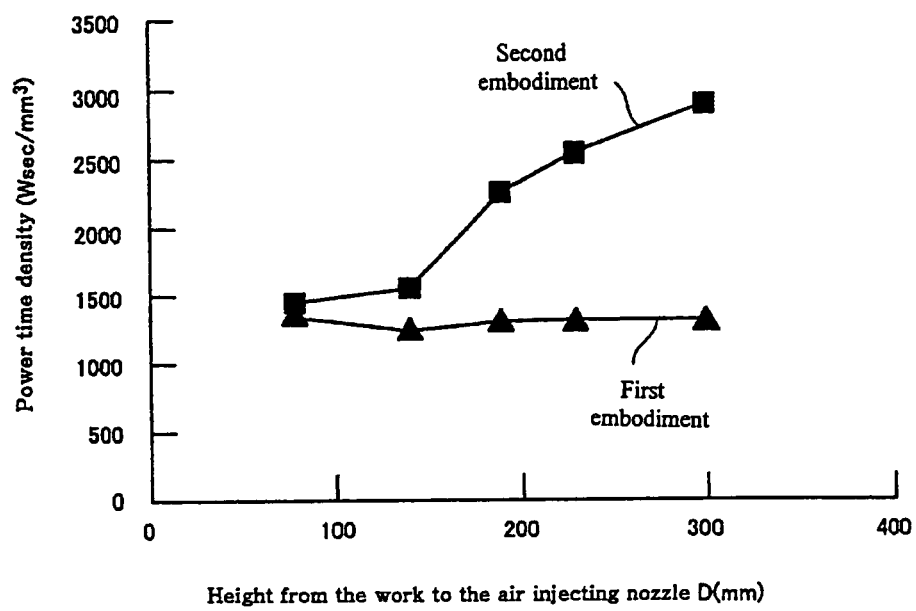
FIG. 18 is a graph illustrating the result from an experiment wherein a laser welding is performed.

FIG. 18 is a graph illustrating the result of an experiment performed using laser welding according to the above conditions. This graph shows the relationship between the power time density and the height D of the air injecting nozzle 7. The power time density can be expressed as follows:

power time density=laser power/condensing area/welding velocity.

From such experimental results for the first embodiment, it can be understood that since the fume H is scattered without floating regardless of the height D from the work piece 200 to the air injecting nozzle 7, the power time density is generally constant.

In the second embodiment, when the height D from the work piece 200 to the air injecting nozzle 7 is low, the fume H does not rise up vertically, and the power time density is low. However, as the height D is increased, the fume H rises up vertically. Thus, the power time density increases. In other words, although the second embodiment is effective where the air injecting position is located around the work piece 200, when the air injecting position is spaced away from the work piece 200 to increase the floating degree of the fume H, the power time density is gradually increased. Therefore, if the floating degree of the fume H is increased, the laser irradiation becomes unstable.

As a result, it can be understood that the fume H is blown out or removed to thereby form a constant welding state without obstruction by the fume H. It is possible to complete welding in a short time and perform an effective welding by blowing out or removing the fume H according to the invention. In particular, the air is injected from the upper side in which the laser processing head 3 is present to the lower side in which the work piece 200 is present. Thus, the fume H can be effectively blown out or removed regardless of the distance between the injecting nozzle and the work piece. The injecting direction of air is directed downwardly, thereby being suitable for remote welding capable of varying the laser irradiating length with various positions or poses. Although the laser irradiating length is set to be 560 mm, it is clear that such a length may be different. If the laser irradiating length becomes longer, then it may be adapted by changing the air injecting pressure and/or the flow rate of the injected air.

While embodiments of the invention are described above, the disclosed invention is not limited to those shown in these embodiments. For example, in each embodiment, although the multi-axis robot is employed various types of robots may be employed. Further, the invention may also be applied to a case in which a fixed laser processing head is employed instead of the robot, etc. Moreover, the invention is not limited to laser welding since it may be applied to any type of processing that uses the laser.

The above described embodiments are configured to inject an air. In remote welding, since the focus length of the laser is long, it is possible to lengthen the length from the laser processing head to the welding point. It is also possible to irradiate in various directions therebetween. Because high pressure and high flow rate is needed in order to blow out or remove a fume over such a wide range, a large amount of fluid is required. As such, it is most economical to use air. As mentioned previously, the fluid to be injected is not limited to air. An inert gas such as nitrogen gas or helium gas can be alternatively used. It is also effective to scatter a fume when various other fluids are injected from the fluid injector (similar to using the air).

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus for conducting laser welding, comprising:
   a laser irradiating unit for irradiating a laser beam to a work;
   a first fluid injecting unit comprising a first fluid injecting nozzle and a fluid deflector and configured to inject a fluid in a cone pattern in a first fluid injecting direction configured to remove a fume produced by the laser beam during welding of the work piece from a path of the laser beam to the work piece, wherein the first fluid injecting unit is positioned external to the laser irradiating unit between a laser beam exit from the laser irradiating unit and the work piece, and the first fluid injecting unit is positioned such that the cone pattern is oblique to the laser beam such that a laser irradiating point on the work piece is separated from the cone pattern of the fluid; and
   a lens protecting element positioned proximal to a laser emitting port on an outer surface of the laser irradiating unit, wherein the first fluid injecting nozzle is positioned between the lens protecting element and the work piece to inject the fluid transverse to the laser beam along the lens protecting element, wherein the fluid deflector is positioned to deflect the fluid in the direction oblique to the laser beam after the fluid passes along the lens protecting element.

2. The apparatus according to claim 1 wherein the first fluid injecting unit is positioned such that the first fluid injecting direction is generally toward the work piece at a location other than the laser irradiating point.

3. The apparatus according to claim 1, further comprising:
   an irradiating direction changing unit operable to change an irradiating direction of the laser beam using a reflecting mirror.

4. The apparatus according to claim 1 wherein the laser irradiating unit is positioned at an end of a robotic arm.

5. The apparatus according to claim 4, further comprising:
   a fluid injecting position moving unit operable to move the first fluid injecting unit relative to the laser beam irradiated from the laser irradiating unit.

6. The apparatus according to claim 5 wherein the fluid injecting position moving unit is operable to move the first fluid injecting unit from a first position to a second position, wherein the second position produces a cone pattern oblique to the laser beam.

7. The apparatus according to claim 4, further comprising:
   a second fluid injecting unit for injecting the fluid in a cone pattern in a second fluid injecting direction to remove the fume from the path, the second fluid injecting unit positioned proximal to the laser irradiating unit such that the second fluid injecting direction different from the first fluid injection direction produces the cone pattern oblique to the laser beam; and
   a switching unit operable to control the fluid to be injected from one or both of the first and second fluid injecting units.

8. The apparatus according to claim 1, further comprising:
   a second fluid injecting unit for injecting the fluid in a second fluid injecting direction to remove the fume from the path, the second fluid injecting direction being different from the first fluid injecting direction, and wherein the fluid injecting units are positioned such that, when viewed from a top of the fluid injecting units and facing a direction of the work piece, an air injecting position of a nozzle of the first fluid injecting unit and an air injecting position of a nozzle of the second fluid injecting unit are spaced apart from each other by an offset width so as to produce a vortex when fluid is simultaneously injected from the fluid injecting units.

9. The apparatus according to claim 1, further comprising:
   a fluid flow path formed at an end of the laser irradiating unit through which a second fluid flows to cool a housing of the laser irradiating unit, wherein the first fluid injecting unit is installed within the fluid flow path such that a gap is formed between a wall of the fluid flow path and the first fluid injecting unit so that the second fluid can exit the fluid flow path.

10. The apparatus according to claim 1, further comprising:
    a plurality of fluid injecting nozzles including the first fluid injecting nozzle, the plurality of fluid injecting nozzles installed in two positions, a first position closer to the lens protecting element and a second position away from the lens protecting element; and wherein
    the first fluid injecting nozzle is installed in the first position, wherein the first fluid injecting nozzle is operable to inject fluid in the first fluid injecting direction at a first pressure;
    a second fluid injecting nozzle of the plurality of fluid injecting nozzles is installed in the second position, wherein the second fluid injecting nozzle is operable to inject fluid in a second fluid injecting direction fluid injecting direction at a second pressure, wherein the injected fluid of each of the first fluid injecting nozzle and the second fluid injecting nozzle is deflected by the fluid deflector in a direction oblique to the laser beam; and
    the first pressure is higher than the second pressure.

11. An apparatus for conducting laser welding, comprising:
    means for irradiating a laser beam to a work piece;
    means for injecting a fluid in a cone pattern in a first fluid injecting direction configured to remove a fume produced by the laser beam on a work piece from a path of the laser beam to the work piece, wherein the injecting means is positioned external to the irradiating means between a laser beam exit from the means for irradiating and the work piece such that the cone pattern is oblique to the laser beam, and a laser irradiating point is separated from the cone pattern of the fluid; and
    means for protecting a lens positioned proximal to a laser emitting port on an outer surface of the means for irradiating the laser, wherein the means for injecting is positioned between the means for protecting the lens and the work piece to inject the fluid transverse to the laser beam along the means for protecting the lens, wherein a fluid deflector is positioned to deflect the fluid in the direction oblique to the laser beam after the fluid passes along the means for protecting the lens.

12. A method of conducting laser welding incorporating a laser irradiating unit with a laser emitting port and a lens protecting element and at least one fluid injecting unit with a fluid deflector, the method comprising:

irradiating a laser beam on a work piece at a laser irradiating point;

injecting a fluid from the at least one fluid injecting unit having at least one fluid injecting nozzle in a cone pattern formed in a direction oblique to the laser beam, wherein the at least one fluid injecting unit is positioned external to the laser irradiating unit between a laser beam exit from the laser irradiating unit and a work piece, wherein the fluid is injected transverse to the laser beam along the lens protecting element;

deflecting the fluid in the direction oblique to the laser beam after the fluid passes along the lens protecting element; and removing a fume produced by the laser beam on the work piece from a path of the laser beam to the workpiece while not directly contacting a laser irradiating point with the injected fluid.

13. The method according to claim 12, further comprising:
changing an irradiating direction of the laser beam using a reflecting mirror.

14. The method according to claim 12, further comprising:
installing the laser irradiating unit at an end of a robotic arm.

15. The method according to claim 12, further comprising:
moving the at least one fluid injecting unit with respect to the laser beam to inject the fluid opposite to a moving direction of the laser irradiating point on the work piece.

16. The method according to claim 12, further comprising:
moving the at least one fluid injecting unit with respect to the laser beam to a position wherein the at least one fluid injecting unit does not interfere with the work piece and a peripheral structure of the work piece.

17. The method according to claim 12 wherein the at least one fluid injecting unit includes a first fluid injecting unit and a second fluid injecting unit, each having a different fluid injecting direction, the method further comprising:

controlling the fluid to be injected from either the first or the second injecting unit so that the fluid path is oblique to a moving direction of the laser irradiating point on the work piece.

18. The method according to claim 12 wherein the at least one fluid injecting unit includes a first fluid injecting unit and a second fluid injecting unit, each having a different fluid injecting direction, the method further comprising:

producing a vortex by extracting the fluid from the first and second fluid injecting units.

19. The method according to claim 12, wherein the at least one fluid injecting unit comprises a first fluid injecting nozzle and a second fluid injecting nozzle, the method further comprising:

setting a first pressure at which fluid is injected by the first fluid injecting nozzle, wherein the first fluid injecting nozzle is a first distance from the lens protecting element; and setting a second pressure at which fluid is injected by the second fluid injecting nozzle, wherein the second fluid injecting nozzle is a second distance from the lens protecting element; and wherein the first pressure is higher than the second pressure and the first distance is less than the second distance.

* * * * *